Figure 1:
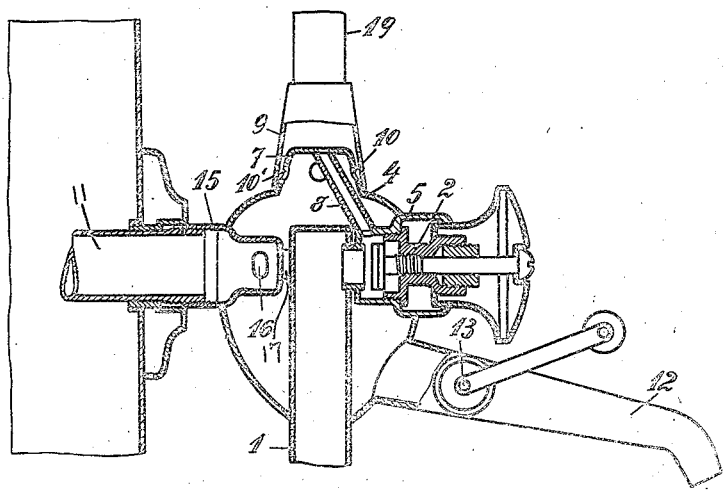

May 8, 1923.

H. JUNKERS

MIXING VALVE

Filed July 1, 1921

1,454,172

2 Sheets-Sheet 1

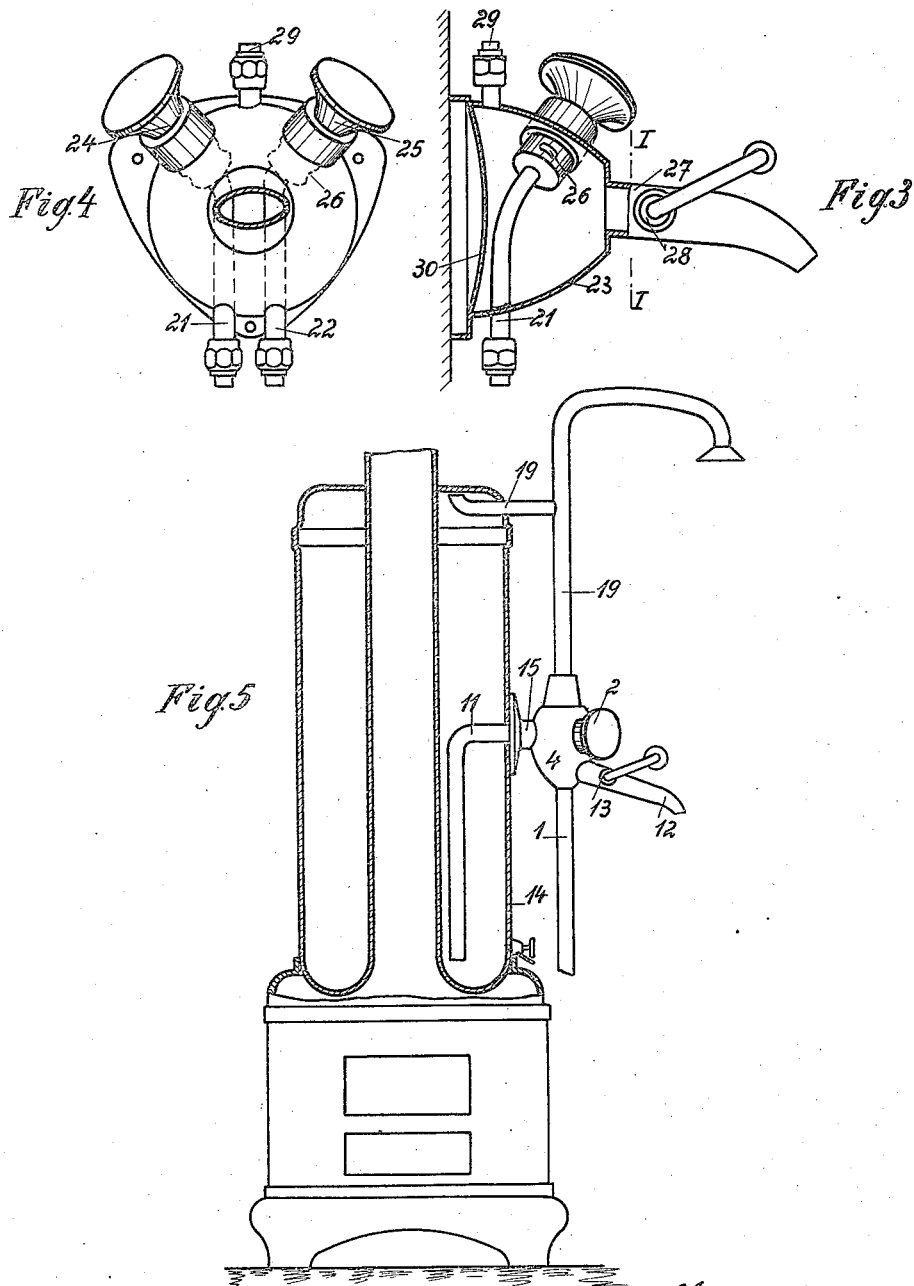

Patented May 8, 1923.

1,454,172

UNITED STATES PATENT OFFICE.

HUGO JUNKERS, OF DESSAU, GERMANY.

MIXING VALVE.

Application filed July 1, 1921. Serial No. 481,999.

*To all whom it may concern:*

Be it known that I, HUGO JUNKERS, a citizen of the German Republic, residing at Dessau, Germany, have invented certain new and useful Improvements in Mixing Valves, of which the following is a specification.

My invention refers to mixing valves and more especially to batteries of valves, cocks or taps for mixing cold and hot water, such batteries being adapted for use in connection with bath-stoves, hot-water installations, washstands and the like.

In the manufacture of such batteries of mixing valves, it is customary to produce the battery as a single casting. This construction proved rather unsatisfactory owing to the involved passages which had to be provided in the battery casing. It was frequently found that passages had been stopped up or cores displaced during the casting so that many castings had to be scrapped besides the waste ordinarily caused by the porosity of cast materials. Later on such batteries of valves were built up of a number of castings, whereby the difficulties were somewhat mitigated, but not entirely removed.

In the battery of valves, according to this invention the above stated drawbacks are entirely avoided by replacing the complicated constructional parts with their involved internal and inaccessible passages by parts of plain shape, namely valve castings formed as simple rotation bodies, which are inserted in a battery casing of drawn or pressed sheet-metal. The casing also encloses the necessary connecting pipes so that in spite of the separation of the apparatus into its constituent parts the unity of the whole is preserved and the separate parts are effectively protected against accidental damage by external influences. The separate parts can owing to their simple shapes also be easily produced from sheet-metal by drawing or pressing, whereby flaws in consequence of porous places are almost excluded. Should they, however, accidentally occur, the pores in this construction would as a rule be rendered harmless, as water penetrating through them would only enter the casing and hence flow into the bath or the like through the discharge spout. By using pressed or drawn parts instead of castings the expenditure of labor in the manufacture of these batteries is limited to a minimum.

The casing of drawn-sheet metal is preferably formed as a simple rotation body, whereby it is possible to construct the battery of mixing valves so, that it only presents round, easily cleaned surfaces, which is a great advantage from a sanitary point of view. It will be understood, however, that the casing may be given any other shape produced by drawing, for reasons of suitability or for the sake of appearance.

In the drawings affixed to this specification and forming part thereof two modifications of a battery embodying my invention are illustrated by way of example.

In the drawings:

Fig. 1 is a longitudinal section and

Figure 2:
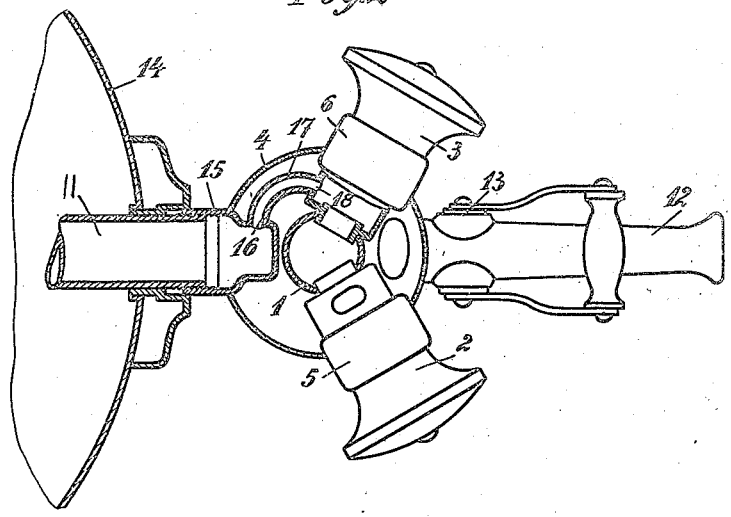

Fig. 2 a cross-section of a battery which is particularly suitable for use with bath-stoves, while Fig. 3 is a longitudinal section and Fig. 4 a sectional front elevation along line I—I of Fig. 3 of a battery which is particularly adapted to be fixed on the wall just above the bath, and Fig. 5 is a longitudinal section through a bath-stove boiler fitted with the improved battery disclosed in Figs. 1 and 2.

In the embodiment shown in Figs. 1 and 2 only a single inlet-pipe 1 is provided to which are joined the valves 2 and 3. In Fig. 1 only the valve 2 is visible, which in order to show the construction more clearly, has been turned through an angle of about 60° into the vertical plane through which the section has been laid. The casing 4 of the battery is produced as a drawn sheet-metal hollow body through the walls of which the valve boxes 5 and 6, soldered, brazed or electrically welded in place, of the valves 2 and 3 extend outwards. The rotation body 4 possesses at the top a central nipple with a port connected with the outlet chamber of the valve 2 by a tube 8, so that the water when the valve 2 is open ascends from the pipe 1 through the valve 2 and the tube 8.

The nipple 7 is, furthermore, provided with lateral perforations 10, 10 and surrounded at some distance from these perforations by the pipe 9 which is in communication with the shower-bath pipe 19. This pipe at the same time serves as hot-water pipe, so that hot water from the boiler of the bath-stove can enter through the openings 10, 10 into the interior of the casing 4. An outlet pipe or spout 12 fitted with a cock 13 is joined to the casing 4. The battery is fixed upon the boiler 14 by means of a lateral branch pipe 15 extending into the casing 4, which is also produced by drawing or pressing and which is provided at one side of its closed inner end with an opening 16 which is connected by a curved tube 17 with the outlet chamber 18 of the valve 3.

In Fig. 5 the battery above described is shown as applied to a bath-stove. Its manner of working is as follows: When the valve 3 is opened, cold water from the pipe 1 flows through the valve 3, the tube 17 and the branch 15 into the inlet-pipe 11 of the boiler 14, and displaces the hot water contained therein upwards, where it enters the hot-water and shower-bath pipe 19. If the cock 13 is closed, the hot water can only escape through the sprinkler of the shower-bath. If however, the cock 13 is open, the water flows through the perforations 10 into the interior of the battery casing 4 and hence through cock 13 and the spout 12 into the bath. If colder water is desired, the valve 2 is opened whereupon cold water from the pipe 1 flows through the valve 2 and the tube 8 into the hot-water pipe and shower-bath pipe of the stove from where, according to the position of the cock 13, it flows either to the shower-bath spray or into the bath.

The inner construction of the wall battery in Figs. 3 and 4 is distinguished from the preceding one by two pipes 21, 22 (for cold and hot water) being provided, which are introduced into the interior of the sheet-metal casing 23, closed by the bottom plate 30. Each of the two pipes has a valve 24 or 25, respectively, fixed to its end. The valves are of similar construction to the valves 2 and 3 of Figs. 1 and 2, but their outlet ports communicate with the interior of the casing 23. At the front the casing 23 is furnished with a spout 27 into which, if the battery is connected with a shower-bath installation, a cock 28 is fitted, in which case also a socket 29, for the shower-bath pipe is provided upon the casing 23. This battery operates in the following manner: On one of the valves 24, 25 being opened cold or hot water flows into the casing 23 and hence into the bath, if the cock 28 is open, or to the shower-bath, if cock 28 is closed.

It will be understood that I do not limit myself to the exact details of the construction or the arrangements shown, but that these may be varied within the ambit of the claims without departing from the spirit of my invention.

I claim:

1. A mixing valve battery comprising in combination, a pressed sheet metal casing, a plurality of complete screw down valves outwardly projecting through the wall of said casing and separate pipe connections inserted in said casing and connected with said valves.

2. A mixing valve battery comprising in combination, a pressed sheet metal casing formed as a rotation body, a plurality of complete screw down valves outwardly projecting through the wall of said casing and separate pipe connections inserted in said casing and connected with said valves.

3. A mixing valve battery comprising in combination, a pressed sheet metal casing, a cold water feed tube extending from below into said casing and a plurality of complete screw down valves projecting into said casing and connected with the upper portion of said feed tube, means for supplying hot water and means for exhausting cold water.

4. A mixing valve battery comprising in combination, a pressed sheet metal casing, a plurality of complete screw down valves outwardly projecting through the wall of said casing and a hot water feed tube adapted to connect the interior of said casing with the hot water compartment of a liquid heater.

5. A mixing valve battery comprising in combination, a pressed sheet metal casing, a plurality of complete screw down valves outwardly projecting through the wall of said casing, a perforated projection on said casing communicating with the interior thereof, and a pipe on said projection adapted to connect it with the hot water compartment of a liquid heater.

6. A mixing valve battery comprising in combination, a pressed sheet metal casing, a plurality of complete screw down valves outwardly formed as rotation bodies and projecting through the wall of said casing and separate pipe connections inserted in said casing and connected with said valves.

7. A mixing valve battery comprising in combination, a pressed sheet metal casing, a plurality of complete screw down valves outwardly formed as rotation bodies and projecting through the wall of said casing, the body of each valve being contracted at the end which extends into said casing, an internally threaded filling and stuffing box for the valve spindle being inserted into the contracted portion, and separate pipe connections inserted in said casing and connected with said valves.

8. A mixing valve battery comprising in combination, a pressed sheet metal casing, a hot water feed tube projecting from above into said casing, a plurality of complete screw down valves projecting through the wall of said casing, a cold water feed tube connected with one of said valves and a tube connecting said valve with said hot water tube.

9. A mixing valve battery comprising in combination, a pressed sheet metal casing, a connecting tube adapted to connect said casing with the hot water compartment of a liquid heater, a plurality of complete screw down valves and a cold water feed tube projecting through the wall of said casing and a tube connecting one of said valves with said connecting tube.

In testimony whereof I affix my signature

HUGO JUNKERS.